Nov. 1, 1955  G. L. MOSES  2,722,616
EVAPORATIVE COOLING SYSTEM FOR DYNAMO-ELECTRIC MACHINES
Filed April 18, 1952

INVENTOR
Graham L. Moses.
BY *O. B. Buchanan*
ATTORNEY

United States Patent Office 2,722,616
Patented Nov. 1, 1955

2,722,616

EVAPORATIVE COOLING SYSTEM FOR DYNAMO-ELECTRIC MACHINES

Graham L. Moses, Pittsburgh, Pa., assignor to Westinghouse Electric Corporation, East Pittsburgh, Pa., a corporation of Pennsylvania Application April 18, 1952, Serial No. 283,073

10 Claims. (Cl. 310—54)

My invention relates to the cooling of dynamoelectric machines, and particularly to the cooling of large turbine generators of the type shown in the copending Baudry and Heller applications, Serial Nos. 248,851 and 248,852, filed September 28, 1951. Such machines commonly operate in hydrogen, or other light gas, which reduces the windage losses and possesses other advantages.

My present invention has to do with an improved gas-tight cooling-system for cooling the stator-windings of such machines. According to my invention, the gas-tight cooling-system for the stator-windings is filled with an inert insulating liquid preferably vaporizable and having a molecular weight higher than 150 and having a boiling point, at the pressures prevailing in the cooling-system, higher than 25° C. and lower than the highest optimum temperature-conditions obtaining in the winding-conductors of the stator-winding during the normal operation of the machine. According to my invention, a plurality of relatively small-bore inlet-tubes of electrically insulating material are used for leading the coolant, in its liquid state, into the metal tubes or cooling-ducts of the stator-winding, and a plurality of relatively large-bore outlet-tubes of electrically insulating material are used for leading the coolant, in its vaporous state, out of these metal tubes or cooling-ducts. The cooling-system also includes a condenser for condensing the vaporized coolant, and some sort of means for maintaining a recirculation of the coolant within the cooling-system. In this way, I rely upon the heat of vaporization, rather than, or in addition to, the heat-storage capacity, of the cooling fluid.

A simplified illustrative form of embodiment of my invention is shown in the accompanying drawing, wherein.

Figure 1:
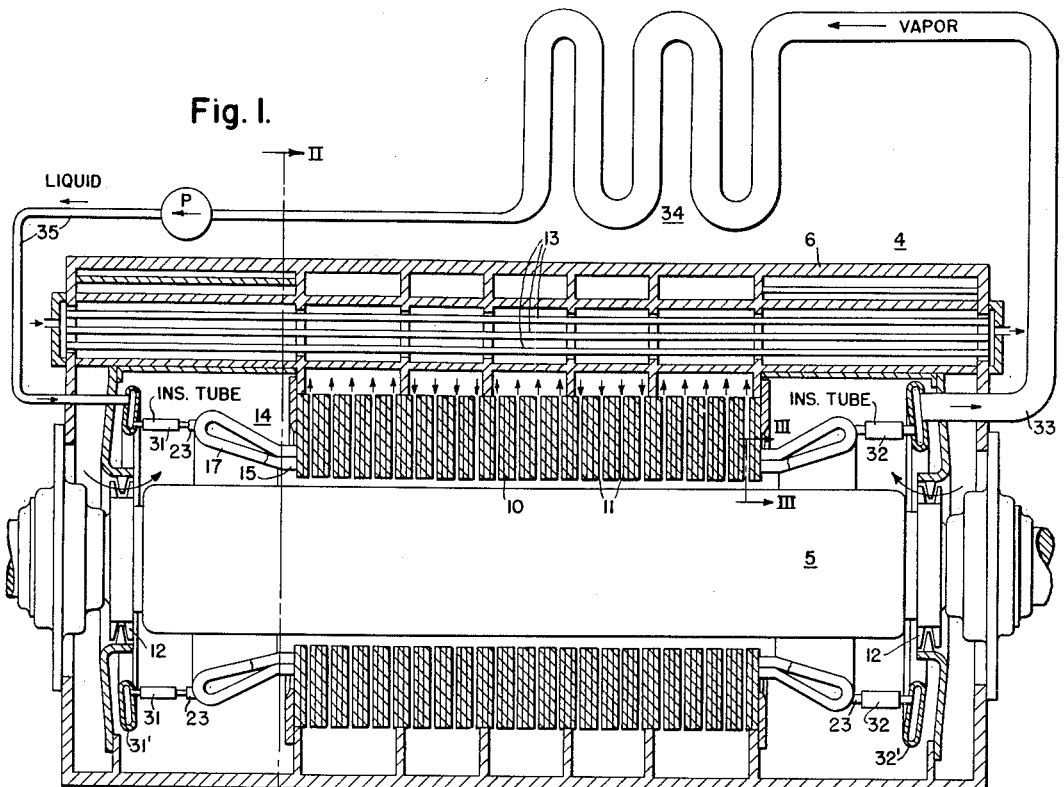
Fig. 1 is a partially diagrammatic and much simplified longitudinal sectional view, not to scale, illustrating an exemplary form of embodiment of my invention as applied to a two-pole turbine generator, the section-plane through the generator being indicated by the broken section-line I—I in Fig. 2.
Figure 2:
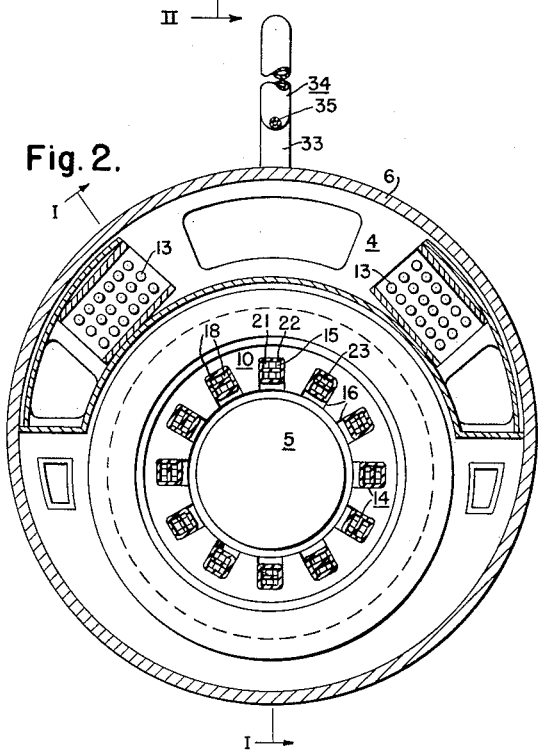
Fig. 2 is a transverse cross-sectional view, on the section-plane II—II in Fig. 1.

The drawing illustrates the application of my invention to a large turbine generator, which may be exemplified by a two-pole, 60-cycle, three-phase generator having a rating in excess of 150,000 kilowatts, at a voltage of at least 5,000 or 10,000 volts, usually more, although I am not limited, of course, to any particular rating. The generator comprises a stator member 4 and a rotor member 5 which are enclosed in a substantially gas-tight housing 6, which is filled with a light gas which bathes both the stator member and the rotor member within said housing, this gas preferably being hydrogen, or possibly helium, or other gas having a molecular weight lower than 15. This gas may be at any pressure, as is known, and it may be used, in any known manner, to ventilate the rotor-member alone, or usually to ventilate both the rotor member 5 and the stator member 4.

In the illustrated hydrogen-cooling system, the stator member 4 is provided with an annular laminated stator core 10 which has therein a plurality of radially disposed venting-spaces 11. Each end of the rotor member 5 carries a fan or blower 12 which causes the proper circulation of the hydrogen. The hydrogen-circulation system also includes one or more coolers 13, which may be of a conventional type and disposition.

My present invention has particular relation to the cooling of the stator member 4, and particularly the cooling of the stator-winding 14 which may be regarded as consisting of a plurality of coils or half-coils having straight coil-side portions 15 lying in the respective conductor-receiving stator-slots 16 of the stator core 10. These straight coil-side portions 15 are bent, at their ends, into end-winding portions 17 at the respective ends of the machine.

Figure 3:
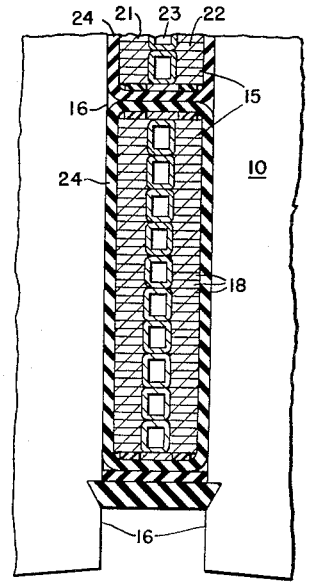
Fig. 3 is a fragmentary cross-sectional view through one of the stator-slots, on a somewhat larger scale, the section-plane being indicated at III—III in Fig. 1.

In large machines of the type to which my invention more particularly relates, it is necessary to subdivide at least the straight coil-side portions 15, and preferably the entire stator-winding 14, in a stranded construction including a plurality of relatively lightly insulated conductor-strands 18, as shown in Fig. 3. This stranded construction is needed, particularly in the slot-occupying straight coil-side portions 15, so that eddy currents or circulating currents may be reduced by the proper transposition of the positions of the strands, as is well understood in the art.

In accordance with my present invention, the stator-winding cooling is applied in cooling-ducts which are provided by suitable spacer-means or other duct-forming expedients, so that the cooling-ducts are in direct or good thermal contact with the conductors themselves, or with the lightly insulated conductor-strands 18, particularly the portions of the strands which are in the straight coil-side portions 15 which lie within the stator-slots 16. I prefer to use the types of stator-winding cooling-ducts which are described and claimed in the previously mentioned Baudry-Heller application Serial No. 248,852. An illustrative or representative form of embodiment of such stator-winding cooling-ducts is shown in the accompanying drawing in Fig. 3, from which it will be seen that the conductor-strands 18 of the slot-lying coil-side portions 15 are disposed in two circumferentially displaced stacks 21 and 22, which are separated by a stack of metal tubes or thin-walled tubular duct-members 23 which are lightly insulated from each other and disposed between said two stacks 21 and 22 of the strands.

The coils of the stator-winding 14 are encased in a major-insulation sheathing-means 24, which is disposed around both the conductor-strands 18 and the cooling-duct or ducts 23 of each of the stranded winding-portions or coils. This major-insulation sheathing-means 24 constitutes a thick heat-insulating barrier between the stator-winding conductors 18 and the stator core 10, so that it is extremely desirable, and in some cases practically necessary, to introduce the stator-winding cooling-means inside of this thick insulating sheath 24, so as to carry the conductor-heat directly away from the conductors, without having first to cause the conductor-heat to pass into the stator-core, and then extract it from the stator-core.

While any suitable duct-forming spacer-means might be used, for the cooling-ducts 23, I have chosen, for illustration, the use of a stack of discrete thin-walled, rectangular cross-sectioned, tubular duct-members 23, which are preferably lightly insulated from each other so as to reduce eddy currents. These tubular duct-members 23 should preferably be made of a non-magnetic material, so as to avoid unnecessary flux-leakage, and to reduce losses and vibration. These duct-members 23 should preferably be made of metal, in order that they may conduct heat readily; but the metal should preferably be a high-resistance metal such as brass or a nickel-chromium-iron alloy coated Inconel. At any rate, in order to avoid excessive eddy-current loss in the duct-members 23, they should have an electrical conductivity which is considerably less than copper, when measured in an encircling direction around a cross section of any tubular duct-member. A metallic duct-member material is also desirable in order to provide the requisite mechanical strength, in a member having walls which are thin enough to provide the flexibility necessary for the bending-operations which are involved in the formation of the coils.

In accordance with my present invention, I provide a vaporization-type of stator-winding cooling-system, in which the latent heat of vaporization of the coolant plays an important part in the transferring of heat from the stator-winding conductors 18 to the coolant-fluid. Evaporative cooling-systems have been known before, in which the evaporation is caused to take place on or near the outer surface of the major-insulation sheathing 24, as set forth in the Hill Patents 2,561,737 and 2,561,738 granted July 24, 1951. There are two major objections to Dr. Hill's evaporative cooling-system, as applied to the stator members of large dynamoelectric machines. One objection is that the vaporization of available coolants for this purpose produces heavy gases which cannot be permitted to surround the rotor member, because they would involve far too much windage-loss. The other major objection is that the major-insulation sheathing, such as is shown at 24 in Fig. 3 of the accompanying drawing, constitutes a really formidable heat-barrier which blocks the escape of heat from the stator-winding conductors 18 to the outer surface of this barrier or sheathing 24.

These objections are avoided, in my present invention, by the use of a gas-tight cooling-system which includes the previously described cooling-ducts or tubes 23, with suitably connected piping forming a gas-tight recirculative cooling system. A characteristic feature of my invention, broadly stated, involves the use of a plurality of relatively small-bore insulating inlet-tubes 31 for leading the coolant, in its liquid state, into the respective cooling-ducts or tubes 23 of the respective coils of the stator-winding 14, and a plurality of relatively large-bore insulating outlet-tubes 32 for leading the coolant, in its vaporous state, out of the respective cooling-ducts or tubes 23. The liquid coolant is introduced into the insides of the respective conductor-cooling ducts or tubes 23, either at a single point, or at a plurality of distributed points along the length of said tubes, producing the effect of a spray, as described in the previously mentioned Hill patents. The essential feature, so far as the novel aspects of my present invention are concerned, is that the coolant shall be introduced, inside of the winding-cooling tubes 23, in the liquid state, so that the vaporization of the liquid in the tubes, as a result of the operating-temperatures of the stator-winding 14, will produce a cooling effect which is effective directly within these cooling-tubes 23.

The individual inlet and outlet-tubes 31 and 32 are made of an electrically insulating material, and have a sufficient length so as to provide the necessary creepage-distance for the insulation-strength which is required by the stator-winding 14. The individual insulating inlet-tubes 31 may be connected to an annular inlet-header 31', and in like manner the individual insulating outlet-tubes 32 may be connected to an annular outlet-header 32'.

The vaporized coolant is withdrawn, as a gas, from the conductor-cooling tubes 23 through the annular outlet-header 32' and an outlet-pipe 33, which leads the gas or vapor to a condenser 34, wherein the vapor is cooled to a temperature below its boiling-point, producing a liquid which is returned to the inlet-header 31' through an inlet-pipe 35. At one or more points in the recirculating cooling-system just described, a suitable means is provided for maintaining a recirculation of the coolant-filling within the cooling-system, such means being illustrated or exemplified in the form of a pump P which is disposed in the inlet-pipe 35.

The vaporizable coolant which fills the gas-tight stator-winding cooling-system may be any of the known inert insulating vaporizable liquids having a boiling point in the range from 30° to 150° C. (at one atmosphere), or, say, having a boiling point, at the pressures prevailing in the cooling system, higher than 25° C. and lower than the highest optimum temperature-conditions obtaining in the conductor-strands 18 of the stator-winding 14 during the normal operation of the machine, this latter temperature depending upon the heat-withstanding qualities of the stator-winding insulation, and also upon the desired life of the insulation. Quite a number of such coolant-fluids are known, including those which are mentioned in the previously cited Hill patents. Very acceptable presently available insulating fluids for this purpose include the methyl and dimethyl perfluoro-cyclohexanes, $C_7F_{14}$ and $C_8F_{16}$, having the following properties:

| Formula | $C_7F_{14}$ | $C_8F_{16}$ |
| --- | --- | --- |
| Molecular Weight | 350 | 400 |
| Boiling Point ° C | 76 | 102 |
| Density | 1.8 | 1.85 |
| Heat of Vaporization (calories per mol) | 7,830 | 8,580 |

The presently available vaporizable cooling-fluids having the requisite properties are all heavy-molecule fluids, having molecular weights which are in excess of 150 or 200. Such high molecular weights are desirable from a cooling-standpoint, because they contribute strongly to the amount of heat which can be carried away by a given quantity of fluid. At the same time, the very heaviness of the coolant-molecule precludes its use in the main gas-tight housing 6 of the dynamo-electric machine, where its vapors would bathe the rotor-member 5, because of the high windage-losses which would be entailed. That is the reason why I provide a separate gas-tight cooling-system for containing the vaporizable coolant. The most pertinent consideration, aside from the requisite boiling point, is the heat of vaporization per gallon of the cooling liquid, and this heat of vaporization depends, in turn, upon the molecular weight. My preferred fluids absorb something like 12 or 13 kilowatts, with the evaporation of one gallon of the fluid per minute, which makes a very satisfactory cooling-medium for the stator-windings of a dynamo-electric machine.

While I have illustrated my invention, very diagrammatically, in a much simplified form, in only one illustrative form of embodiment, I wish it to be understood that my invention is not limited to the precise details which are shown or described.

I claim as my invention:
1. A dynamo-electric machine having a stator member, a rotor member, a substantially gas-tight housing enclosing said stator and rotor members, a filling of a gas bathing both said stator member and said rotor member within said housing, said gas having a molecular weight lower than 15, and a recirculation-means for said gas, said recirculation-means including a cooler; said stator member comprising an annular core having axially extending conductor-receiving stator-slots therein, a stator-winding having a voltage-rating of at least 5,000 volts and having one or more straight coil-side portions lying in each of said conductor-receiving stator-slots, said stator-winding also having end-winding portions joining the straight coil-side portions at the respective ends of the machine, each of a plurality of at least said straight coil-side portions being a stranded winding-portion including a plurality of relatively lightly insulated conductor-strands, each of said stranded winding-portions including a spacer-means for providing one or more cooling-ducts lying alongside of the lightly insulated strands of that stranded winding-portion, a major-insulation sheathing-means disposed around the conductor-strands and cooling-duct or ducts of each of said stranded winding-portions, and a gas-tight cooling-system having a coolant-filling of an inert insulating vaporizable liquid having a molecular weight higher than 150 and having a boiling point, at the pressures prevailing in the cooling-system, higher than 25° C. and lower than the highest optimum temperature-conditions obtaining in the conductor-strands of the stator-winding during the normal operation of the machine, said cooling-system including a plurality of relatively small-bore inlet-tubes of electrically insulating material for leading the coolant, in its liquid state, into the respective cooling-ducts of the stator-winding, a plurality of relatively large-bore outlet-tubes of electrically insulating material for leading the coolant, in its vaporous state, out of the respective cooling-ducts, a condenser for condensing the vaporized coolant, and means for maintaining a recirculation of the coolant-filling within said cooling system.

2. A dynamo-electric machine having a stator member, a rotor member, a substantially gas-tight housing enclosing said stator and rotor members, a filling of a gas bathing both said stator member and said rotor member within said housing, said gas having a molecular weight lower than 15, and a recirculation-means for said gas, said recirculation-means including a cooler; said stator member comprising an annular core having axially extending conductor-receiving stator-slots therein, a stator-winding having a voltage-rating of at least 5,000 volts and having a plurality of stranded winding-portions, each having a straight coil-side portion lying in a conductor-receiving stator-slot, each of said stranded winding-portions including a plurality of relatively lightly insulated conductor-strands, disposed in two circumferentially displaced stacks, each of said stranded winding-portions further including a stack of thin-walled tubular duct-members lightly insulated from each other and disposed between said two stacks of strands, a major-insulation sheathing-means disposed around said two stacks of strands and their intervening tubular duct-members, said tubular duct-members having an electrical conductivity considerably less than copper, as measured in an encircling direction around a cross section of any tubular duct-member, and a gas-tight cooling system having a coolant-filling of an inert insulating vaporizable liquid having a molecular weight higher than 150 and having a boiling point, at the pressures prevailing in the cooling-system, higher than 25° C. and lower than the highest optimum temperature-conditions obtaining in the conductor-strands of the stator-winding during the normal operation of the machine, said cooling-system including a plurality of relatively smal-bore inlet-tubes of electrically insulating material for leading the coolant, in its liquid state, into the tubular duct-members of the respective stranded winding-portions, a plurality of relatively large-bore outlet-tubes of electrically insulating material for leading the coolant, in its vaporous state, out of the tubular duct-members of the respective stranded winding-portions, a condenser for condensing the vaporized coolant, and means for maintaining a recirculation of the coolant-filling within said cooling-system.

3. A dynamo-electric machine characterized by having a stator member comprising an annular core having axially extending conductor-receiving stator-slots therein, a stator-winding having a voltage-rating of at least 5,000 volts and having one or more straight coil-side portions lying in each of said conductor-receiving stator-slots, said stator-winding also having end-winding portions joining the straight coil-side portions at the respective ends of the machine, each of a plurality of at least said straight coil-side portions being a stranded winding-portion including a plurality of relatively lightly insulated conductor-strands, each of said stranded winding-portions including a spacer-means for providing one or more cooling-ducts lying alongside of the lightly insulated strands of that stranded winding-portion, a major-insulation sheathing-means disposed around the conductor-strands and cooling-duct or ducts of each of said stranded winding-portions, and a gas-tight cooling-system having a coolant-filling of an inert insulating vaporizable liquid having a molecular weight higher than 150 and having a boiling point, at the pressures prevailing in the cooling-system, higher than 25° C. and lower than the highest optimum temperature-conditions obtaining in the conductor-strands of the stator-winding during the normal operation of the machine, said cooling-system including a plurality of relatively small-bore inlet-tubes of electrically insulating material for leading the coolant, in its liquid state, into the respective cooling-ducts of the stator-winding, a plurality of relatively large-bore outlet-tubes of electrically insulating material for leading the coolant, in its vaporous state, out of the respective cooling-ducts, a condenser for condensing the vaporized coolant, and means for maintaining a recirculation of the coolant-filling within said cooling-system.

4. A dynamo-electric machine characterized by having a stator member comprising an annular core having axially extending conductor-receiving stator-slots therein a stator-winding having a voltage-rating of at least 5,000 volts and having a plurality of stranded winding-portions, each having a straight coil-side portion lying in a conductor-receiving stator-slot, each of said stranded winding-portions including a plurality of relatively lightly insulated conductor-strands, disposed in two circumferentially displaced stacks, each of said stranded winding-portions further including a stack of thin-walled tubular duct-members lightly insulated from each other and disposed between said two stacks of strands, a major-insulation sheathing-means disposed around said two stacks of strands and their intervening tubular duct-members, said tubular duct-members having an electrical conductivity considerably less than copper, as measured in an encircling direction around a cross section of any tubular duct-member, and a gas-tight cooling-system having a coolant-filling of an inert insulating vaporizable liquid having a molecular weight higher than 150 and having a boiling point, at the pressures prevailing in the cooling-system, higher than 25° C. and lower than the highest optimum temperature-conditions obtaining in the conductor-strands of the stator-winding during the normal operation of the machine, said cooling-system including a plurality of relatively small-bore inlet-tubes of electrically insulating material for leading the coolant, in its liquid state, into the tubular duct-members of the respective stranded winding-portions, a plurality of relatively large-bore outlet-tubes of electrically insulating material for leading the coolant, in its vaporous state, out of the tubular duct-members of the respective stranded winding-portions, a condenser for condensing the vaporized coolant, and means for maintaining a recirculation of the coolant-filling within said cooling-system.

5. A dynamo-electric machine having a stator member, a rotor member, a substantially gas-tight housing enclosing said stator and rotor members, a filling of a gas bathing both said stator member and said rotor member within said housing, said gas having a molecular weight lower than 15, and a recirculation-means for said gas, said recirculation-means including a cooler; said stator member comprising an annular core having axially extending conductor-receiving stator-slots therein, a stator-winding having a voltage-rating of at least 5,000 volts and having one or more straight coil-side portions lying in each of said conductor-receiving stator-slots, said stator-winding also having end-winding portions joining the straight coil-side portions at the respective ends of the machine, each of a plurality of at least said straight coil-side portions being a stranded winding-portion including a plurality of relatively lightly insulated conductor-strands, each of said stranded winding-portions including a duct-means for providing one or more cooling-ducts in good thermal contact with one or more of said conductor-strands, a major-insulation sheathing-means disposed around the conductor-strands and cooling-duct or ducts of each of said stranded winding-portions, and a gas-tight cooling-system separate, and hermetically sealed, from the space within said housing, and having a coolant-filling of an inert insulating fluid, said gas-tight cooling-system including insulating fluid-conducting means, disposed inside of, and hermetically sealed from, the space within said housing, for leading the cooling-fluid into the respective cooling-ducts of the stator-winding, insulating fluid-conducting means, disposed inside of, and hermetically sealed from, the space within said housing, for leading the cooling-fluid out of the respective cooling-ducts, and recirculation-means, including a fluid-cooling heat-exchanger, and hermetically sealed piping-means, for maintaining a recirculation of the cooling-fluid within said gas-tight cooling-system.

6. The invention as defined in claim 5, characterized by said cooling-fluid being a liquid which is led into the respective cooling-ducts.

7. The invention as defined in claim 5, characterized by said cooling-fluid being a vaporizable liquid and having such physical constants that it is a liquid as it is led into the respective cooling-ducts, it vaporizes in the ducts, and it is a vapor as it is led out of the ducts, and said heat-exchanger being a condenser for condensing said vapor.

8. A dynamo-electric machine characterized by having a stator member comprising an annular core having axially extending conductor-receiving stator-slots therein, a stator-winding having a voltage-rating of at least 5,000 volts and having one or more straight coil-side portions lying in each of said conductor-receiving stator-slots, said stator-winding also having end-winding portions joining the straight coil-side portions at the respective ends of the machine, each of a plurality of at least said straight coil-side portions being a stranded winding-portion including a plurality of relatively lightly insulated conductor-strands, each of said stranded winding-portions including duct-means for providing one or more cooling-ducts in good thermal contact with one or more of said conductor-strands, a major-insulation sheathing-means disposed around the conductor-strands and cooling-duct or ducts of each of said stranded winding-portions, and a gas-tight cooling-system separate, and hermetically sealed, from the space within said machine, and having a coolant-filling of an inert insulating fluid, said gas-tight cooling-system including insulating fluid-conducting means, disposed inside of, and hermetically sealed from, the space within said machine, for leading the cooling-fluid into the respective cooling-ducts of the stator-winding, insulating fluid-conducting means, disposed inside of, and hermetically sealed from, the space within said machine, for leading the cooling-fluid out of the respective cooling-ducts, and recirculation-means, including a fluid-cooling heat-exchanger, and hermetically sealed piping-means, for maintaining a recirculation of the cooling-fluid within said gas-tight cooling-system.

9. The invention as defined in claim 8, characterized by said cooling-fluid being a liquid which is led into the respective cooling-ducts.

10. The invention as defined in claim 8, characterized by said cooling-fluid being a vaporizable liquid and having such physical constants that it is a liquid as it is led into the respective cooling-ducts, it vaporizes in the ducts, and it is a vapor as it is led out of the ducts, and said heat-exchanger being a condenser for condensing said vapor.

References Cited in the file of this patent

UNITED STATES PATENTS

| | | |
|---|---|---|
| 646,500 | Moody | Apr. 3, 1900 |
| 1,145,612 | Porter | July 6, 1915 |
| 1,448,700 | Seidner | Mar. 13, 1923 |
| 1,499,411 | Schroeder | July 1, 1924 |
| 1,761,387 | Gay | June 3, 1930 |
| 2,390,130 | Sigmund | Dec. 4, 1945 |

FOREIGN PATENTS

| | | |
|---|---|---|
| 165,383 | Great Britain | June 30, 1921 |
| 172,839 | Switzerland | Feb. 1, 1935 |
| 337,334 | Great Britain | Oct. 30, 1930 |
| 374,828 | Great Britain | Dec. 11, 1930 |
| 543,949 | Great Britain | Mar. 20, 1942 |